(12) United States Patent
Gabbay et al.

(10) Patent No.: US 9,641,465 B1
(45) Date of Patent: May 2, 2017

(54) PACKET SWITCH WITH REDUCED LATENCY

(71) Applicant: Mellanox Technologies Ltd., Yokneam (IL)

(72) Inventors: Freddy Gabbay, Givatayim (IL); Ido Bukshpan, Herzliya (IL); Alon Webman, Tel Aviv (IL); Miriam Menes, Tel Aviv (IL); George Elias, Tel Aviv (IL); Noam Katz Abramovich, Tel Aviv (IL)

(73) Assignee: Mellanox Technologies, Ltd, Yokneam (IL)

( * ) Notice: Subject to any disclaimer, the term of this patent is extended or adjusted under 35 U.S.C. 154(b) by 138 days.

(21) Appl. No.: 13/972,968

(22) Filed: Aug. 22, 2013

(51) Int. Cl.
*H04L 12/861* (2013.01)

(52) U.S. Cl.
CPC .................................. *H04L 49/90* (2013.01)

(58) Field of Classification Search
None
See application file for complete search history.

(56) References Cited

U.S. PATENT DOCUMENTS

| | | | |
|---|---|---|---|
| 5,367,520 A | 11/1994 | Cordell | |
| 5,440,752 A | 8/1995 | Lentz et al. | |
| 5,574,885 A | 11/1996 | Denzel et al. | |
| 5,802,057 A | 9/1998 | Duckwall et al. | |
| 5,924,119 A | 7/1999 | Sindhu et al. | |
| 6,160,814 A | 12/2000 | Ren et al. | |
| 6,169,741 B1 | 1/2001 | LeMaire et al. | |
| 6,195,721 B1 | 2/2001 | Rice | |
| 6,314,487 B1 | 11/2001 | Hahn et al. | |
| 6,438,130 B1 | 8/2002 | Kagan et al. | |
| 6,456,590 B1 | 9/2002 | Ren et al. | |
| 6,463,484 B1 * | 10/2002 | Moss | 710/36 |
| 6,535,963 B1 | 3/2003 | Rivers | |

(Continued)

FOREIGN PATENT DOCUMENTS

| | | |
|---|---|---|
| EP | 1698976 A1 | 9/2006 |
| WO | 03024033 A1 | 3/2003 |

OTHER PUBLICATIONS

U.S. Appl. No. 12/876,265 Office Action dated May 1, 2013.

(Continued)

*Primary Examiner* — Jeffrey M Rutkowski
*Assistant Examiner* — Andre Tacdiran
(74) *Attorney, Agent, or Firm* — D. Kligler IP Services Ltd.

(57) ABSTRACT

A switching device includes a plurality of ports and a switching core, which is coupled to transfer data packets between ingress and egress ports. Switching logic maintains a descriptor queue containing respective descriptors corresponding to the data packets that have been received and queued by the ports, and responsively to the respective descriptors, instructs the switching core to transfer the queued data packets between the ports. Port logic, which is associated with each port, is configured, upon receipt of a data packet from the network at the port, to signal the switching logic to place a descriptor corresponding to the data packet in the descriptor queue and, upon identifying the data packet as meeting a predefined criterion, to convey a request to the switching logic, bypassing the descriptor queue, to instruct the switching core to transfer the data packet immediately to an egress port.

17 Claims, 4 Drawing Sheets

(56) References Cited

U.S. PATENT DOCUMENTS

| | | | |
|---|---|---|---|
| 6,539,024 B1 | 3/2003 | Janoska et al. | |
| 6,606,666 B1 | 8/2003 | Bell et al. | |
| 6,687,256 B2* | 2/2004 | Modali | H04L 47/10 370/394 |
| 6,700,871 B1* | 3/2004 | Harper | H04L 1/1877 370/230 |
| 6,788,701 B1* | 9/2004 | Mahalingaiah et al. | 370/429 |
| 6,804,767 B1* | 10/2004 | Melvin | H04L 45/745 711/216 |
| 6,831,918 B1 | 12/2004 | Kavak | |
| 6,895,015 B1 | 5/2005 | Chiang et al. | |
| 6,922,408 B2 | 7/2005 | Bloch et al. | |
| 7,088,713 B2 | 8/2006 | Battle et al. | |
| 7,136,381 B2 | 11/2006 | Battle et al. | |
| 7,243,177 B1* | 7/2007 | Davis | H04L 47/10 370/231 |
| 7,327,749 B1 | 2/2008 | Mott | |
| 7,590,058 B1 | 9/2009 | Cherchali et al. | |
| 7,609,636 B1 | 10/2009 | Mott | |
| 7,650,424 B2 | 1/2010 | Armitage | |
| 7,724,760 B2 | 5/2010 | Balakrishnan et al. | |
| 7,773,622 B2 | 8/2010 | Schmidt et al. | |
| 7,796,629 B1 | 9/2010 | MacAdam et al. | |
| 7,853,738 B2 | 12/2010 | Pothireddy et al. | |
| 7,936,770 B1 | 5/2011 | Frattura et al. | |
| 8,014,288 B1 | 9/2011 | MacAdam | |
| 8,149,710 B2 | 4/2012 | Bergamasco et al. | |
| 8,175,094 B2 | 5/2012 | Bauchot et al. | |
| 8,270,295 B2 | 9/2012 | Kendall et al. | |
| 8,274,971 B2 | 9/2012 | Battle et al. | |
| 8,570,916 B1 | 10/2013 | Tang et al. | |
| 2001/0023469 A1 | 9/2001 | Jeong et al. | |
| 2002/0012340 A1 | 1/2002 | Kalkunte et al. | |
| 2002/0027908 A1 | 3/2002 | Kalkunte et al. | |
| 2002/0039357 A1 | 4/2002 | Lipasti et al. | |
| 2003/0026287 A1* | 2/2003 | Mullendore | H04L 49/103 370/442 |
| 2003/0048792 A1 | 3/2003 | Xu et al. | |
| 2003/0053474 A1* | 3/2003 | Tuck et al. | 370/422 |
| 2003/0076849 A1 | 4/2003 | Morgan et al. | |
| 2003/0095560 A1 | 5/2003 | Arita et al. | |
| 2003/0118016 A1 | 6/2003 | Kalkunte et al. | |
| 2003/0137939 A1 | 7/2003 | Dunning et al. | |
| 2003/0198231 A1 | 10/2003 | Kalkunte et al. | |
| 2003/0198241 A1 | 10/2003 | Putcha et al. | |
| 2003/0200330 A1 | 10/2003 | Oelke et al. | |
| 2004/0008716 A1* | 1/2004 | Stiliadis | 370/429 |
| 2004/0066785 A1 | 4/2004 | He et al. | |
| 2005/0243816 A1* | 11/2005 | Wrenn | H04L 49/90 370/389 |
| 2005/0259574 A1 | 11/2005 | Figueira et al. | |
| 2006/0155938 A1 | 7/2006 | Cummings et al. | |
| 2006/0159104 A1* | 7/2006 | Nemirovsky | G06F 9/546 370/395.7 |
| 2006/0182112 A1 | 8/2006 | Battle et al. | |
| 2007/0025242 A1 | 2/2007 | Tsang | |
| 2007/0038829 A1 | 2/2007 | Tousek | |
| 2007/0070901 A1 | 3/2007 | Aloni et al. | |
| 2007/0201497 A1* | 8/2007 | Krishnamurthy | H04L 12/5693 370/412 |
| 2008/0031269 A1* | 2/2008 | Shimizu et al. | 370/412 |
| 2008/0043768 A1* | 2/2008 | Lopez et al. | 370/412 |
| 2009/0003212 A1 | 1/2009 | Kwan et al. | |
| 2009/0010162 A1 | 1/2009 | Bergamasco et al. | |
| 2009/0161684 A1 | 6/2009 | Voruganti et al. | |
| 2010/0100670 A1 | 4/2010 | Jeddeloh | |
| 2011/0058571 A1 | 3/2011 | Bloch et al. | |
| 2011/0075555 A1 | 3/2011 | Ziegler | |
| 2011/0286468 A1* | 11/2011 | Tomonaga | H04L 47/10 370/412 |
| 2012/0002678 A1* | 1/2012 | Jonsson et al. | 370/412 |
| 2012/0105637 A1* | 5/2012 | Yousefi | H04N 7/183 348/148 |
| 2013/0028256 A1 | 1/2013 | Koren | |
| 2015/0363166 A1 | 12/2015 | Christidis | |

OTHER PUBLICATIONS

Raatikainen, P., "ATM Switches—Switching Technology S38. 3165", Switching Technology, L8—1, 34 pages, year 2006 (http://www.netlab.hut.fi/opetus/s383165).

Fahmy, S., "A Survey of ATM Switching Techniques", Department of Computer and Information Science, The Ohio State University, USA, 22 pages, Aug. 21, 1995 (http://www.cs.purdue.edu/homes/fahmy/cis788.08Q/atmswitch.html).

U.S. Appl. No. 13/189,593 Office Action dated Jul. 9, 2013.

Cisco Nexus 3548 and 3524 Switches Data Sheet, Cisco Nexus 3000 Series Switches Overview, Cisco systems Inc., San Jose, California, pp. 1-14, 2013.

U.S. Appl. No. 14/046,976, filed Oct. 6, 2013.

U.S. Appl. No. 13/802,926, filed Mar. 14, 2013.

U.S. Appl. No. 13/763,676 Office Action dated Feb. 26, 2015.

Concer et al., "The connection-then-credit flow control protocol for heterogeneous multicore systems on chip", IEEE transactions on Computer-aided design of integrated circuits and systems, vol. 29, No. 6, pp. 869-882, Jun. 2010.

Radulescu et al., "An efficient on-chip-NI offering guaranteed services, shared-memory abstraction, and flexible network configuration", IEEE transactions on Computer-Aided design of integrated circuits and systems, vol. 24, No. 1, pp. 4-17, Jan. 2005.

U.S. Appl. No. 13/763,676 Office Action dated Mar. 25, 2016.

U.S. Appl. No. 13/763,676 Office Action dated Sep. 8, 2016.

* cited by examiner

PACKET SWITCH WITH REDUCED LATENCY

FIELD OF THE INVENTION

The present invention relates generally to data communications, and particularly to packet switching devices and methods.

BACKGROUND

Packet switches are at the core of modern data networks. When a packet is received by one of the ports of a switch, forwarding logic in the switch processes the packet header in order to determine the output port through which the packet should be transmitted. A switching core, such as crossbar switching logic, within the switch then transfers the packet to the output port. Even in high-speed switches, the header processing, forwarding computations, and packet queuing within the switch all add to the latency of data transfer across the network.

A number of solutions have been proposed and implemented to reduce the latency of patent switching. For example, U.S. Pat. No. 6,438,130, whose disclosure is incorporated herein by reference, describes a device for switching packets that includes a switching core and a plurality of ports, coupled to pass the packets from one to another through the switching core. One or more cache memories are respectively associated with one or more of the ports. Each of the cache memories is configured to hold a forwarding database cache for reference by the receiving port with which the cache memory is associated in determining the destination port of the packet. When a packet arrives at an input port of the switch, the port looks up the destination (e.g., MAC) address of the packet in its cache. When there is a cache hit, the switch sends the packet to the output port indicated in the cache. The port thus saves considerable processing time by avoiding having to read the port from the forwarding database of the switch.

As another example, the Cisco Nexus 3548 switch (produced by Cisco Systems Inc., San Jose, Calif.) offers a feature known as "Warp SPAN," in which traffic arriving at one dedicated ingress port is replicated to a user-configurable group of egress ports. The packet replication happens without any filters or lookup mechanisms, before any traffic classification or ACL [access control list] processing occurs. Because traffic bypasses these processes, the latency for the replicated packets is said to be very low. The Warp SPAN functions independently of and simultaneously with normal traffic forwarding.

SUMMARY

Embodiments of the present invention that are described hereinbelow provide improved methods and devices for low-latency packet switching.

There is therefore provided, in accordance with an embodiment of the present invention, a switching device, including a plurality of ports, which are configured to serve as ingress and egress ports so as to receive, queue, and transmit data packets from and to a network. A switching core is coupled to transfer the data packets between the ingress and egress ports. Switching logic is coupled to maintain a descriptor queue containing respective descriptors corresponding to the data packets that have been received and queued by the ports, to read the descriptors from the descriptor queue, and responsively to the respective descriptors, to instruct the switching core to transfer the queued data packets between the ports. Port logic, which is associated with each port among at least a subset of the ports, is configured, upon receipt of a data packet from the network at the port, to signal the switching logic to place a descriptor corresponding to the data packet in the descriptor queue and, upon identifying the data packet as meeting a predefined criterion, to convey a request to the switching logic, bypassing the descriptor queue, to instruct the switching core to transfer the data packet immediately to an egress port, such that upon grant of the request, the corresponding descriptor is dropped from the descriptor queue.

Typically, upon refusal of the request, the data packet is transferred to the egress port by instruction of the switching logic in response to the corresponding descriptor.

In disclosed embodiments, the device includes a packet buffer, in which the ports queue the data packets for transfer by the switching core, and the switching core includes a first input buffer coupled to receive the data packets from the packet buffer to be transferred in response to the queued descriptors, a second input buffer coupled to receive the data packets from the packet buffer to be transferred in response to requests to bypass the descriptor queue, and a switch coupled to arbitrate between the first and second input buffers. The switching logic may be coupled to receive an indication of a fill status of the second input buffer and to grant the request to bypass the descriptor queue in response to emptying of the second input buffer. The packet buffer may be centralized within the device or distributed among the ports.

In some embodiments, the ports include a forwarding cache, which contains entries indicating respective egress ports for incoming data packets having header fields containing certain predefined values, and the port logic is configured to identify the data packet for immediate transfer to the egress port responsively to a corresponding entry in the forwarding cache. Typically, the port logic is configured, upon receiving incoming data packets that are not identified by the entries in the forwarding cache for immediate transfer to respective egress ports, to signal the switching logic to queue corresponding descriptors without requesting bypass of the descriptor queue.

In disclosed embodiments, the switching logic is configured to instruct the switching core to transfer the data packets to respective egress ports responsively to credits issued by the egress ports, while dividing the credits for each egress port in accordance with a predefined distribution between first transfers of the data packets in response to the queued descriptors and second transfers of the data packets in response to requests to bypass the descriptor queue.

There is also provided, in accordance with an embodiment of the present invention, a method for communication, which includes coupling a switch, including a plurality of ports, which are configured to serve as ingress and egress ports, and a switching core, which is coupled to transfer the data packets between the ingress and egress ports, to receive and transmit data packets from and to a network. Upon receiving a data packet from the network at a given ingress port, a corresponding descriptor is placed in a descriptor queue, containing respective descriptors corresponding to the data packets that have been received and queued by the ports. The descriptors are read from the descriptor queue, using switching logic in the switch, and responsively to the respective descriptors, the switching core is instructed to transfer the queued data packets between the ports. Upon identifying the received data packet at the given ingress port as meeting a predefined criterion, a request is conveyed to the switching logic, bypassing the descriptor queue, to instruct the switching core to transfer the data packet immediately to an egress port. Upon grant of the request by the switching logic, the data packet is transferred to the egress port, and the corresponding descriptor is dropped from the descriptor queue.

The present invention will be more fully understood from the following detailed description of the embodiments thereof, taken together with the drawings in which:

DETAILED DESCRIPTION OF EMBODIMENTS

Figure 1:
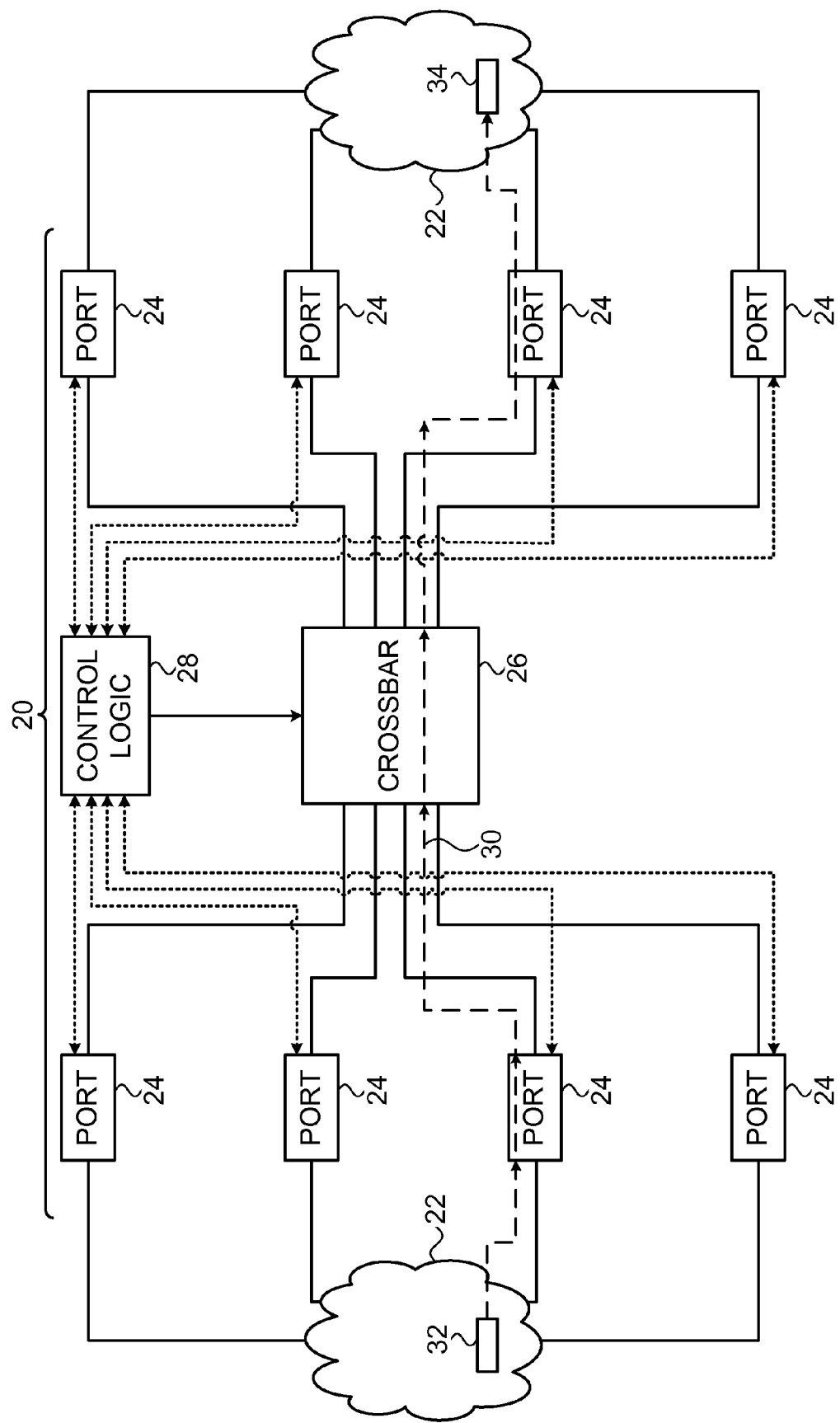
FIG. 1 is a block diagram that schematically illustrates a packet switch, in accordance with an embodiment of the present invention.

High-speed switches that are known in the art comprise a plurality of ports, which serve as both ingress and egress ports so as to receive, queue, and transmit data packets from and to a network. A switching core is coupled to transfer the data packets between the ingress and egress ports.

In order to manage the operation of the switching core (which must serve many packet transfer requests simultaneously), switching logic in the switch typically maintains a descriptor queue containing respective descriptors corresponding to the data packets that have been received and queued by the ports. Upon receipt of a data packet from the network at a given port, port logic associated with the port signals the switching logic to place a descriptor corresponding to the data packet in the descriptor queue. Each descriptor identifies the location of a queued packet and indicates the egress port or ports through which the packet is to be transmitted (and possibly other operations to be applied to the packet). The switching logic reads the descriptors from the descriptor queue in turn, and thus schedules and instructs the switching core to transfer the queued data packets between the ports.

Generating, queuing, and processing the descriptors add substantial latency to the transit of data packets through the switch. Caching of forwarding information at the switch ports can help to reduce this latency but cannot eliminate it. Port replication can eliminate latency, but at the cost of switching flexibility.

Embodiments of the present invention that are described hereinbelow address the problem of switching latency by providing an alternative, accelerated path through the switch, referred to herein for clarity as the "TurboPath" (TP). All or at least a subset of the switch ports may be configured to support TP processing of incoming data packets that they receive from the network. Upon identifying an incoming packet as meeting the criteria for TP forwarding (based on information cached by the port, as explained below), the port logic conveys a TP request to the switching logic, bypassing the descriptor queue and asking to instruct the switching core to transfer the data packet immediately to the appropriate egress port. At the same time, the port logic signals the switching logic to place a corresponding descriptor in the descriptor queue for normal processing. Upon grant of the TP request, the packet is forwarded through the switch, and the corresponding descriptor is dropped from the descriptor queue. On the other hand, if the TP request cannot be granted (due to switch congestion and/or other competing requests, for example), the descriptor will eventually reach the head of the queue, and the packet will be forwarded in the normal way.

TP thus provides an alternative logical path through the switch, over which packets can be forwarded with latency that may be limited only by the physical and logical latency of the data path itself. When used judiciously for selected, high-priority flows, TP can reduce substantially the time required to transmit these flows through a switch fabric or other network. At the same time, because TP operates in parallel with normal (higher-latency) packet switching functionality, the flexibility of descriptor-based forwarding is maintained and is available as a fallback whenever TP forwarding cannot be accomplished.

FIG. 1 is a block diagram that schematically illustrates a packet switch 20, in accordance with an embodiment of the present invention. Switch 20 comprises multiple ports 24, which are connected to a network 22. (For the sake of visual simplicity, network 22 is shown as two separate clouds in FIG. 1, on either side of the switch; but switch 20 may be connected in substantially any sort of network topology, including various sorts of switch fabrics and extended networks that include multiple sub-networks.) Typically, each port 24 serves both as an ingress port, receiving inbound packets from the network, and an egress port, transmitting outbound packets to the network. Although switch 20 is shown, by way of example, as having eight such ports, in practice such a switch may have a smaller or larger (in many cases much larger) number of ports.

A switching core 26, such as a crossbar switch core, transfers data packets between respective ingress ports and egress ports. Switching control logic 28 (also referred to herein simply as "switching logic") controls the operation of switching core 26 so as to cause the core to transfer each received packet in turn to the appropriate egress port or ports. Upon receiving an incoming packet from network 22, the ingress port 24 queues the packet and signals logic 28. Logic 28 processes these signals from the ports in order to decide which packets to switch and in what order and to control switching core 26 accordingly. These functions of the ports and switching logic are explained in greater detail hereinbelow.

Switch 20 may be configured to treat certain packet flows as TurboPath (TP) flows, based on predefined criteria, which are typically defined in terms of the implicit or explicit values of certain header fields of incoming packets. In the pictured example, an incoming data packet 32 reaches one of ports 24 and is identified by the port as satisfying a TP criterion. The port therefore queues the packet for TP transfer through switching core 26, as indicated by a dashed path 30 in FIG. 1, and conveys a request to switching logic 28 to instruct the switching core to transfer the data packet immediately via path 30 to an egress port. This process is described below in greater detail. The egress port then transmits a corresponding outgoing packet 34 to the network.

Typically, switch 20 is produced using one or more suitable integrated circuits, containing high-speed digital logic and suitable interfaces for connection to the network. The description that follows covers only the logical blocks within the switch that are directly involved in implementing features of the present invention. These features are typically integrated with other switching functions that are known in the art, and the design and construction of a switch that incorporates an embodiment of the present invention will thus be apparent to those skilled in the art after reading the present description.

Figure 2:
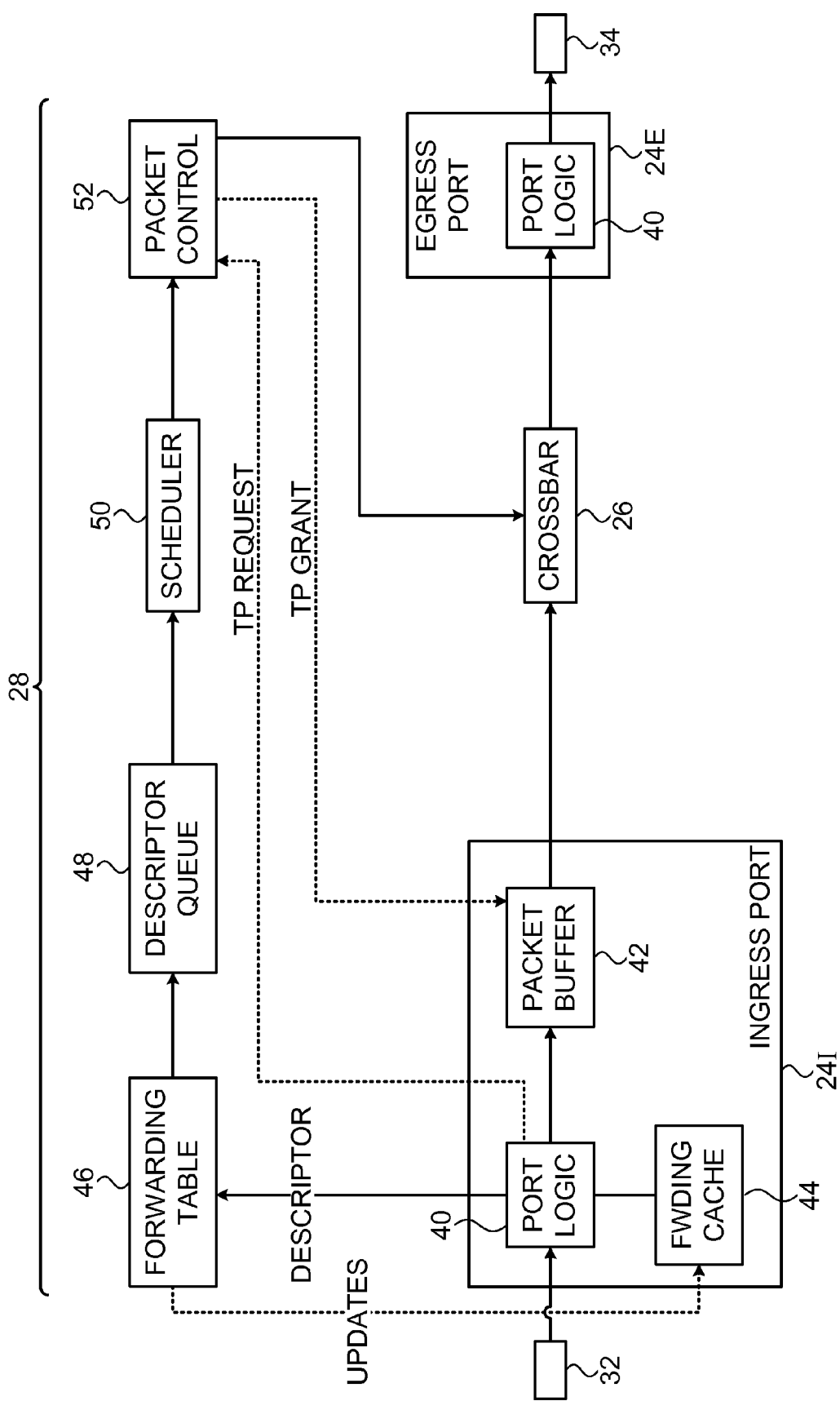
FIG. 2 is a block diagram that schematically shows details of a packet switch, in accordance with an embodiment of the present invention.

FIG. 2 is a block diagram showing details of switch 20, in accordance with an embodiment of the present invention. Only two of the ports are shown: the ingress port, labeled 241, at which packet 32 is received, and the egress port, labeled 24E, from which packet 34 is transmitted to network 22. Key elements of switching control logic 28 are shown at the top of the figure.

Port logic 40 associated with ingress port 241 receives incoming packet 32 and performs physical and logical layer processing before placing the packet in a packet buffer 42 to await forwarding by switching core 26. Port logic 40 signals switching logic 28 with a descriptor based on the values in the packet header fields to indicate that the packet is awaiting transfer. A forwarding table 46 in logic 28 looks up the header fields to determine the egress port to which the packet is to be switched and possibly other egress parameters (such as a virtual lane on which the packet is to be transmitted) and then places the descriptor, with this forwarding information, in a descriptor queue 48. This queue may be organized, for example, as an array of linked lists, with each list corresponding to a particular egress port (or a given virtual lane on the egress port). The descriptor queues maintained by switching logic 28 with respect to different ports can be either centralized or distributed. Similarly, although packet buffer 42 is shown in FIG. 2 as an element of ingress port 241, this buffering function may alternatively or additionally be centralized (in a pool, for example) or distributed among the egress ports.

A scheduler 50 receives credits from ports 24, indicating the availability of each port to transmit outgoing packets. Upon determining that a given port (such as egress port 24E in the present example) has credits available, scheduler 50 reads the corresponding descriptors from descriptor queue 48 and submits a request to packet control logic 52 to transfer the packets to which these descriptors correspond from packet buffer 42 to the egress port. Packet control logic 52 accordingly submits an instruction to switching core 26 to transfer the packet (or packets) from a certain location in buffer 42 of ingress port 241 to egress port 24E. Port logic 40 associated with the egress port then transmits outgoing packet 34 to the network.

In certain cases, however, as explained earlier, port logic 40 of ingress port 241 may initiate accelerated TP transfer of packet 32 through switch 20. To determine whether the packet is eligible for TP transfer, logic 40 consults a forwarding cache 44, which is typically maintained at the ingress port. This cache may be periodically updated with data from forwarding table 46 (or can store forwarding data initialized by a user or network administrator), and it can also be useful in accelerating descriptor-based packet processing, as described, for example, in the above-mentioned U.S. Pat. No. 6,438,130. Cache 44 contains entries indicating respective egress ports for incoming data packets having header fields containing certain predefined values. The cache entries specifically identify sets of header field values that are eligible for TP transfer to the egress port (by setting a TP flag in the corresponding cache line, for example). Forwarding table 46 may update the TP flag settings in cache 44 from time to time, either automatically or under operator control, in accordance with changes in data transfer priorities and network conditions, for example.

Thus, upon receiving packet 32 from network 22, port logic 40 looks up the header field values of the packet in cache 44. Upon occurrence of a cache hit to a line that is flagged for TP forwarding, port logic 40 sends a TP request to packet control logic 52, bypassing descriptor queue 48. The TP request identifies the packet location in buffer 42 and the egress port (and possibly other transmission characteristics, such as the virtual lane) to which the packet is to be directed. Concurrently, port logic 40 signals forwarding table 46 to place a descriptor in descriptor queue 48, in case the TP request is not granted. (Similarly, upon receiving incoming data packets that are not identified as TP-eligible in cache 44, port logic 40 signals forwarding table 46 to queue corresponding descriptor without submitting a TP request.)

Packet control logic 52 handles the TP request immediately upon receipt. Typically, the packet control logic divides the credits for each egress port in accordance with a certain predefined distribution between transfers of packets in response to the descriptors in queue 48 and transfers of packets in response to TP requests, which bypass the descriptor queue. If credits are available for TP packet transfer in response to the request submitted by port logic 40 in port 241, packet control logic 52 will grant the request and will immediately instruct switching core 26 to transfer the packet from its current location in packet buffer 42 to egress port 24E. Logic 52 will also signal scheduler 50 that the TP request with regard to this particular packet has been granted, so that when the descriptor corresponding to the packet reaches the head of queue 48, scheduler 50 will drop the descriptor rather than attempting to have the packet transmitted a second time.

On the other hand, when packet control logic 52 is unable to grant a TP request submitted by port logic 40 (because credits are not immediately available, for example), the TP request will be dropped and the packet in question will remain in buffer 42. The descriptor corresponding to the packet will subsequently advance to the head of descriptor queue 48, and scheduler 50 will then instruct logic 52 to actuate switching core 26 to transmit the packet to the egress port.

A problem of packet ordering can arise, for example, in the following circumstances: A packet in a given flow that is flagged in cache 44 for TP handling is refused TP transfer, so that this packet is held in port buffer 42 and queued for transmission by scheduler 50; this packet is followed immediately by another packet in the same flow, and the TP request for this second packet is granted. In consequence, the second packet could be transferred by switching core to egress port 24E before the first packet.

In order to ensure proper ordering, packet buffer 42 may maintain a counter for each TP-enabled flow. The counter is incremented each time a packet is received into the buffer in this flow and is decremented when the packet is transmitted out of the buffer to switching core 26. TP transmission will be allowed only when the counter value is zero, meaning that there are no earlier packets in the same flow still awaiting transmission. Alternatively, a single counter of this sort may be used collectively for all of the TP-enabled flows from a given ingress port.

Figure 3:
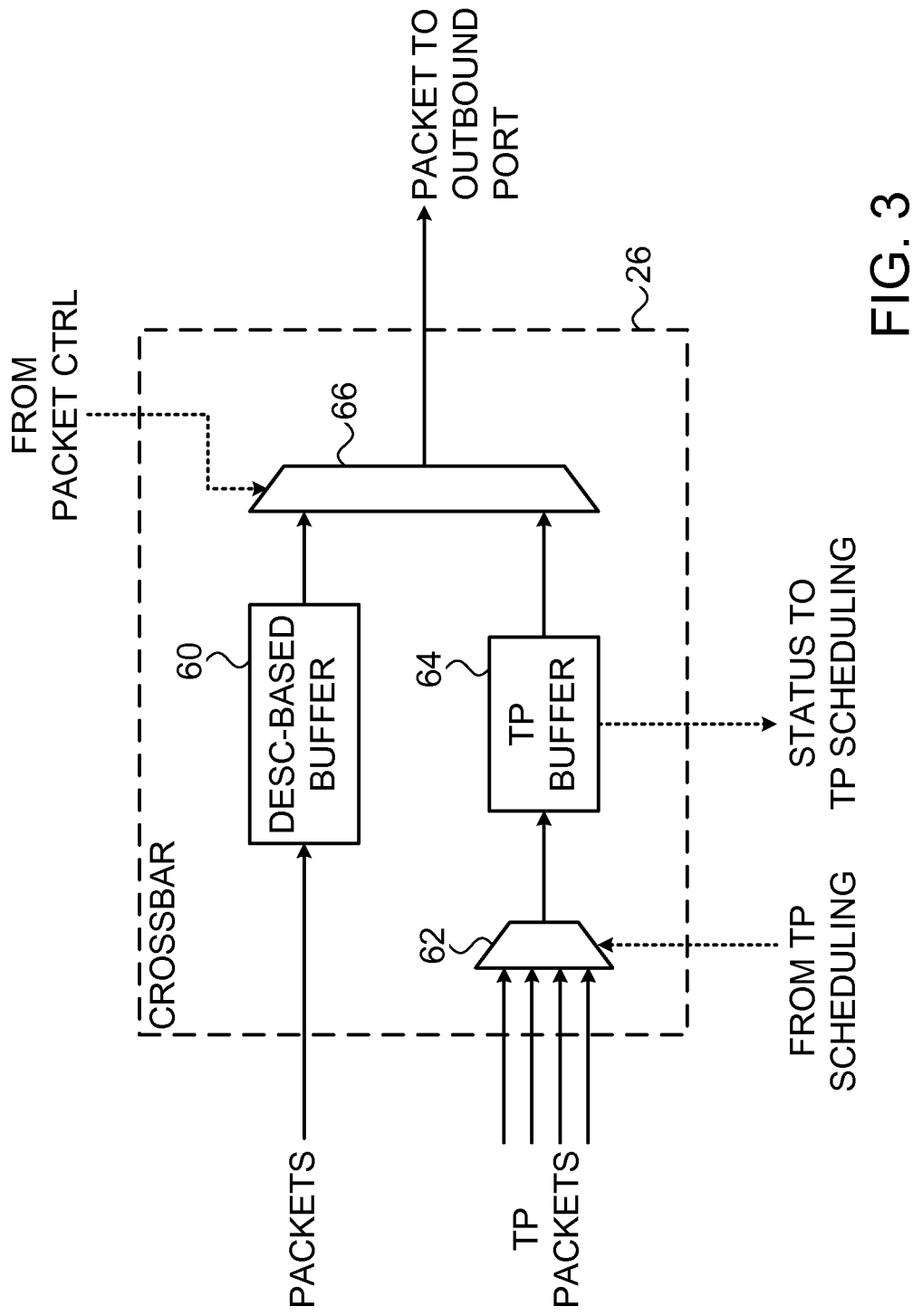
FIG. 3 is a block diagram that schematically shows features of a switching core, in accordance with an embodiment of the present invention.

FIG. 3 is a block diagram that schematically shows features of switching core 26, in accordance with an embodiment of the present invention. This is a simplified drawing, showing only a few components of a more complex crossbar switch, which are involved in switching packets to a particular outbound (egress) port. In practice, the components shown in FIG. 3 are typically replicated many times in order to serve all (or at least a subset) of ports 24 in switch 20. The buffers shown in the figure may be either centralized or distributed at different locations in the switch (for example, at the switch ports).

Switching core 26 comprises an input buffer 60, which receives the data packets from packet buffer 42 that are about to be transferred in response to descriptors read by scheduler 50 from descriptor queue 48. A second input buffer 64 receives the data packets from the packet buffer that are to be transferred in response to TP requests. Both of these buffers are typically small, on the order of the maximum packet size (referred to as the maximum transfer unit, or MTU) that can be handled by switch 20. A selector 66 arbitrates between buffers 60 and 64, under control of packet control logic 52, to select the packets to be transferred to the egress port.

A TP scheduling unit in packet control logic 52 (shown in FIG. 4) monitors the fill status of buffer 64 and will grant a pending TP request only upon emptying of this buffer, i.e., when a status signal from buffer 64 to logic 52 indicates that buffer 64 is empty or nearly empty. Packet buffers 42 are typically provided with dedicated connections to buffers 64 in switching core for use in transferring TP packets. Upon grant of a TP request, packet control logic 52 actuates a selector 62 to transfer the corresponding packet into buffer 64, from which the packet is then transferred via selector 66 to the appropriate egress port.

Figure 4:
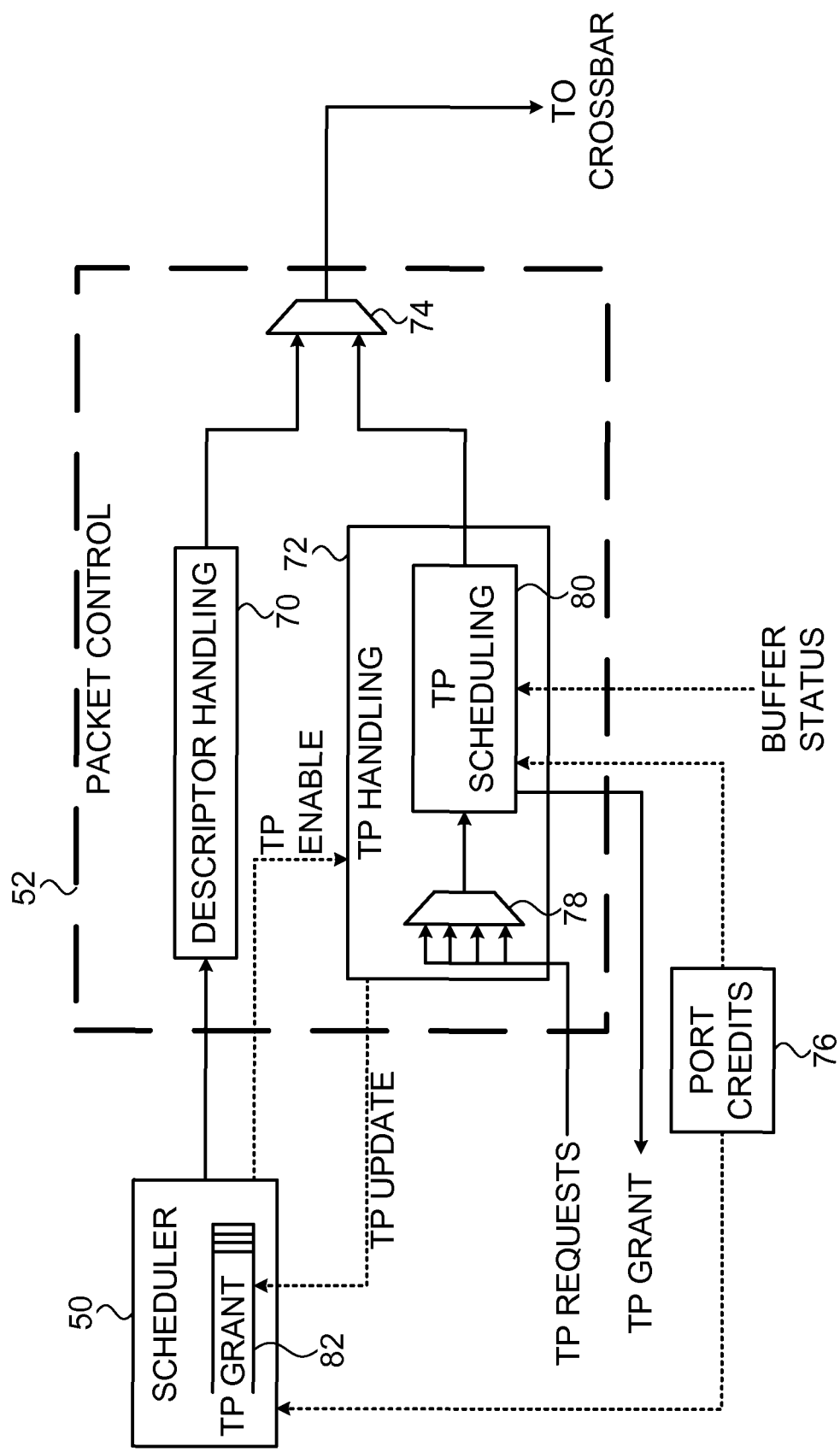
FIG. 4 is a block diagram that schematically shows details of switching logic, in accordance with an embodiment of the present invention.

FIG. 4 is a block diagram that schematically shows details of switching control logic 28, in accordance with an embodiment of the present invention. This figure illustrates particularly the functions of TP handling logic 72 within packet control logic 52. Logic 72 operates when enabled by switching control logic 28, for example by means of a TP enable signal from scheduler 50 in the pictured embodiment.

TP requests from ingress ports 24 are passed in turn by an arbiter 78 to a TP scheduling unit 80 within TP handling logic 72. At the same time, scheduler 50 passes descriptors from descriptor queue 48 to descriptor handling logic 70. Both descriptor handling logic 70 and TP handling logic 72 generate switching instructions with respect to packets awaiting transfer, and these instructions are passed to switching core 26 in succession by a multiplexer 74. The actual data are transferred from the ingress port to the egress port in parallel with the TP requests.

Upon grant of a TP request, TP handling logic 72 notifies scheduler 50, for example by placing a corresponding entry in a TP grant queue 82. Before passing a descriptor corresponding to a given packet to descriptor handling logic 70, scheduler 50 checks whether there is an entry in queue 82 corresponding to the same packet. If so, the descriptor is dropped. Because of the low latency of TP handling and forwarding through switch 20, relative to normal descriptor-based handling, scheduler 50 can generally be assured that if a given packet is transferred by TP, the request will have been granted and the corresponding entry placed in TP grant queue 82 before the descriptor reaches the head of descriptor queue 48 for processing. Alternatively, to ensure that there is no duplication of switching instructions, TP handling logic 72 may periodically place a fence in queue 82 and flush pending TP requests before allowing scheduler 50 to proceed with descriptor processing.

As noted earlier, port credits 76 for each egress port (and possibly each virtual lane) are divided between scheduler 50 and TP scheduling unit 80. TP scheduling unit 80 will grant a given TP request, assuming TP buffer (FIG. 3) is empty or nearly so, only when unit 80 has sufficient credits available for the egress port in question. Scheduler 50 likewise passes descriptors to descriptor handling logic 70 only when it has sufficient credits available for the desired egress port. Credits 76 for each port 24 may be divided between scheduler 50 and TP scheduling unit 80 on a uniform basis across all ports (for example, ⅔ of the credits to scheduler 50 and ⅓ to TP scheduling unit 80) or in different proportions for different ports, depending on the configuration and management of network 22 and the needs of applications using the network. Additionally or alternatively, credit division may be adjusted adaptively by management logic in or associated with switch 20, based on the relative proportions of TP and normal packet transfers that are requested, for example.

Although the above embodiments relate, for the sake of clarity of explanation, to a particular switch design, the principles of TP forwarding may be implemented in other high-speed packet switching architectures, and such alternative implementations are considered to be within the scope of the present invention. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A switching device, comprising:
   a plurality of ports, which are configured to serve as ingress and egress ports so as to receive, queue, and transmit data packets from and to a network;
   a switching core, which is coupled to transfer the data packets between the ingress and egress ports;
   switching logic, which is coupled to maintain a descriptor queue containing respective descriptors corresponding to the data packets that have been received and queued by the ports, to read the descriptors from the descriptor queue according to their turn in the descriptor queue, and to instruct the switching core to transfer the queued data packets referred to by the read descriptors, between the ports; and
   port logic associated with a specific one of the ports, configured to determine, upon receipt of a data packet from the network at the specific port, whether the data packet meets a predefined criterion, and
   responsive to determining that the data packet does not meet the predefined criterion:
      signal the switching logic to place a descriptor corresponding to the data packet in the descriptor queue, and
   responsive to identifying the data packet as meeting the predefined criterion, to:
      signal the switching logic to place a descriptor corresponding to the data packet in the descriptor queue, and
      convey a request to the switching logic, to instruct the switching core to begin to transfer the data packet immediately to an egress port, before the descriptor corresponding to the data packet is read and processed by the switching logic,
      wherein the conveying of the request to the switching logic is a separate act from the signaling of the switching logic to place a descriptor corresponding to the data packet in the descriptor queue,
   wherein the switching logic is configured to signal the corresponding descriptor in the descriptor queue as intended to be dropped, upon grant of the request to begin to transfer the data packet immediately, so that responsively to determining that the corresponding descriptor reaches a head of the descriptor queue the packet will not be transferred a second time.

2. The device according to claim 1, wherein the data packet is transferred to the egress port by instruction of the switching logic responsively to determining that the corresponding descriptor advances to a head of the descriptor queue.

3. The device according to claim 1, and comprising a packet buffer, in which the ports queue the data packets for transfer by the switching core, and wherein the switching core comprises:
   a first input buffer coupled to receive the data packets from the packet buffer to be transferred in response to the queued descriptors;
   a second input buffer coupled to receive the data packets from the packet buffer to be transferred in response to requests to begin to transfer the data packet immediately; and
   a switch coupled to arbitrate between the first and second input buffers.

4. The device according to claim 3, wherein the switching logic is coupled to receive an indication of a fill status of the second input buffer and to grant the request to begin to transfer the data packet immediately in response to emptying of the second input buffer.

5. The device according to claim 3, wherein the packet buffer is centralized within the device.

6. The device according to claim 3, wherein the packet buffer is distributed among the ports.

7. The device according to claim 1, wherein the ports comprise a forwarding cache, which contains entries indicating respective egress ports for incoming data packets having header fields containing certain predefined values, and wherein the port logic is configured to identify the data packet for immediate transfer to the egress port responsively to finding for the data packet a corresponding entry in the forwarding cache.

8. The device according to claim 7, wherein the port logic is configured, upon receiving incoming data packets that are not identified by the entries in the forwarding cache for immediate transfer to respective egress ports, to signal the switching logic to queue corresponding descriptors without requesting to begin to transfer the data packet immediately.

9. The device according to claim 1, wherein the switching logic is configured to instruct the switching core to transfer the data packets to respective egress ports according to credits issued by the egress ports, while dividing the credits for each egress port in accordance with a predefined distribution between first transfers of the data packets referred to by descriptors read from the queued descriptors and second transfers of the data packets in response to requests to begin to transfer the data packet immediately.

10. The device according to claim 1, wherein the switching logic is configured to drop the corresponding descriptor from the descriptor queue upon granting the request to transfer the data packet immediately to an egress port.

11. A method for communication, comprising:
   coupling a switch, comprising a plurality of ports, which are configured to serve as ingress and egress ports, and a switching core, which is coupled to transfer data packets between the ingress and egress ports, to receive and transmit data packets from and to a network;
   upon receiving a data packet from the network at a given ingress port, placing a corresponding descriptor in a descriptor queue, containing respective descriptors corresponding to data packets that have been received and queued by the ports;
   reading the descriptors from the descriptor queue, using switching logic in the switch, and instructing the switching core to transfer the queued data packets referred to by the read descriptors, between the ports;
   determining at the given ingress port, whether the data packet meets a predefined criterion;
   upon identifying the received data packet at the given ingress port as meeting the predefined criterion, conveying a request to the switching logic, to instruct the switching core to begin to transfer the data packet immediately to an egress port, before the descriptor corresponding to the data packet is read and processed by the switching logic, wherein the conveying of the request to the switching logic is a separate act from placing the descriptor corresponding to the data packet in the descriptor queue; and
   upon grant of the request by the switching logic, transferring the data packet to the egress port and signaling the corresponding descriptor from the descriptor queue as intended to be dropped, so that responsively to determining that the corresponding descriptor reaches a head of the descriptor queue the packet will not be transferred a second time.

12. The method according to claim 11, and comprising, upon refusal of the request, transferring the data packet to the egress port by instruction of the switching logic responsively to determining that the corresponding descriptor advances to a head of the descriptor queue.

13. The method according to claim 11, wherein transferring the data packet comprises arbitrating between a first input buffer coupled to receive the data packets to be transferred in response to the queued descriptors and a second input buffer coupled to receive the data packets to be transferred in response to requests to transfer the data packet immediately to an egress port.

14. The method according to claim 13, wherein transferring the data packet comprises granting the request to transfer the data packet immediately to an egress port only in response to emptying of the second input buffer.

15. The method according to claim 11, wherein identifying the received data packet comprises comparing header field values from the received data packet to entries in a forwarding cache indicating respective egress ports for incoming data packets having header fields containing certain predefined values, and identifying the data packet for immediate transfer to the egress port responsively to finding a corresponding entry in the forwarding cache.

16. The method according to claim 15, wherein placing the corresponding descriptor comprises, upon receiving incoming data packets that are not identified by the entries in the forwarding cache for immediate transfer to respective egress ports, signaling the switching logic to queue corresponding descriptors without requesting to transfer the data packet immediately to an egress port.

17. The method according to claim 11, wherein transferring the data packet comprises instructing the switching core to transfer the data packets to respective egress ports responsively to credits issued by the egress ports, while dividing the credits for each egress port in accordance with a predefined distribution between first transfers of the data packets referred to by descriptors read from the queued descriptors and second transfers of the data packets in response to requests to transfer the data packet immediately to an egress port.

\* \* \* \* \*